United States Patent [19]

Sawada et al.

[11] Patent Number: 5,581,026

[45] Date of Patent: Dec. 3, 1996

[54] FLOW METER

[75] Inventors: Yukio Sawada, Anjo; Yukio Mori, Nagoya; Ryo Nagasaka, Nagoya; Tsunemitsu Kato, Nagoya; Takao Ban, Toyohashi; Kunihiro Umezu, Kariya; Noboru Kitahara, Kariya; Minoru Kondo, Kariya, all of Japan

[73] Assignee: Nippondenso Co., Ltd., Kariya, Japan

[21] Appl. No.: 319,030

[22] Filed: Oct. 6, 1994

Related U.S. Application Data

[62] Division of Ser. No. 992,211, Dec. 17, 1992, abandoned.

[30] Foreign Application Priority Data

| Dec. 19, 1991 | [JP] | Japan | 3-336636 |
| May 8, 1992 | [JP] | Japan | 4-116306 |
| Oct. 8, 1992 | [JP] | Japan | 4-270328 |
| Oct. 8, 1992 | [JP] | Japan | 4-270337 |
| Oct. 8, 1992 | [JP] | Japan | 4-270341 |

[51] Int. Cl.$^6$ ................................. G01F 5/00
[52] U.S. Cl. ............................. 73/202; 73/118.2
[58] Field of Search ..................... 73/118.2, 202, 73/202.5, 204.21, 204.22

[56] References Cited

U.S. PATENT DOCUMENTS

| 3,314,290 | 4/1967 | Peranio | 73/202 |
| 4,562,731 | 1/1986 | Nishimura et al. | 73/202 |
| 4,709,581 | 12/1987 | Nishimura et al. | 73/202 |
| 4,739,651 | 4/1988 | Smith . | |
| 4,887,577 | 12/1989 | Arai et al. . | |
| 4,991,560 | 2/1991 | Arai et al. . | |
| 5,179,858 | 1/1993 | Atwood | 73/118.2 |
| 5,209,113 | 5/1993 | Sawada et al. | 73/202.5 |

FOREIGN PATENT DOCUMENTS

| 0255054 | 2/1988 | European Pat. Off. . |
| 0428364 | 5/1991 | European Pat. Off. . |
| 0458081 | 11/1991 | European Pat. Off. . |
| 60-185118 | 9/1985 | Japan . |
| 62-235525 | 10/1987 | Japan . |
| 2044352 | 10/1980 | United Kingdom . |

OTHER PUBLICATIONS

Patent Abstract of Japan vol. 8, No. 169, Aug. 4, 1984.

*Primary Examiner*—Richard Chilcot
*Assistant Examiner*—Jewel Artis
*Attorney, Agent, or Firm*—Cushman, Darby & Cushman; IP Group of Pillsbury; Madison & Sutro LLP

[57] ABSTRACT

A flow meter for measuring a flow rate of fluid includes a body providing a main passage through which the fluid flows. A plurality of support elements connect an inner wall surface of the body and a central element so as to support the central element substantially at the center of the main passage. An introducing port opens to the central element for introducing a part of the fluid flowing through the main passage. A branch passage is formed within the central element, through which such part of the fluid flows. A sensor is disposed within the branch passage for measuring a flow rate within the branch passage. An outlet opens to a portion of the central element located at upperstream of the downstream ends of the support elements for returning the fluid flowing through the branch passages to the main passage.

13 Claims, 9 Drawing Sheets

FIG. 6A
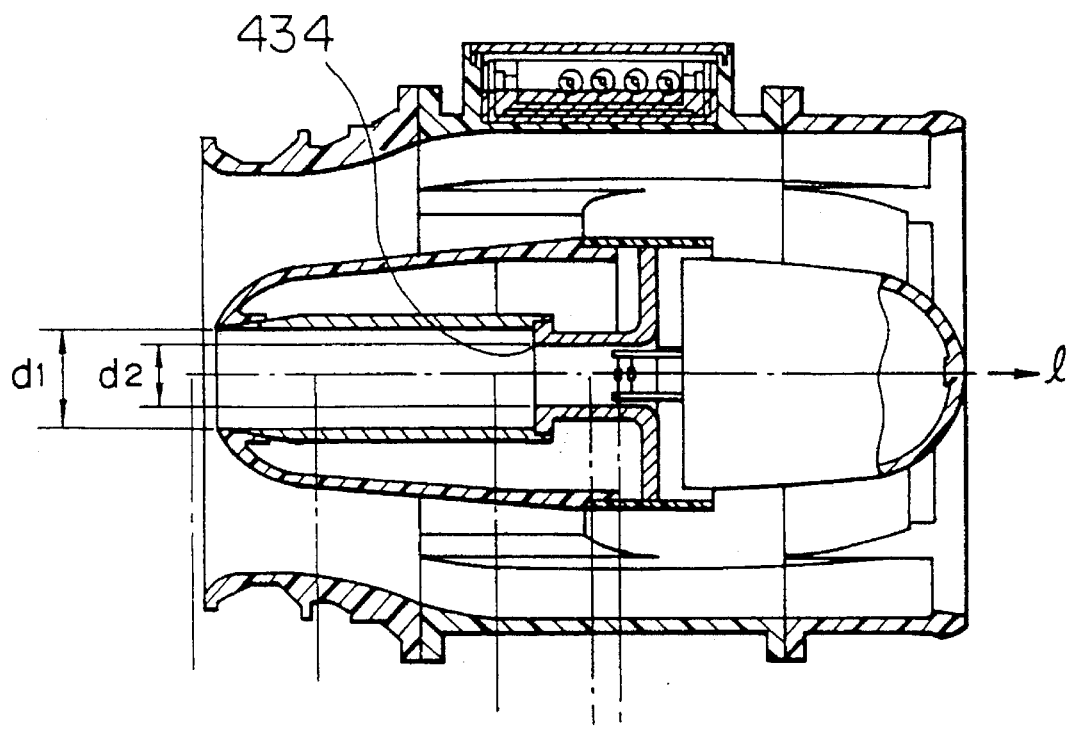
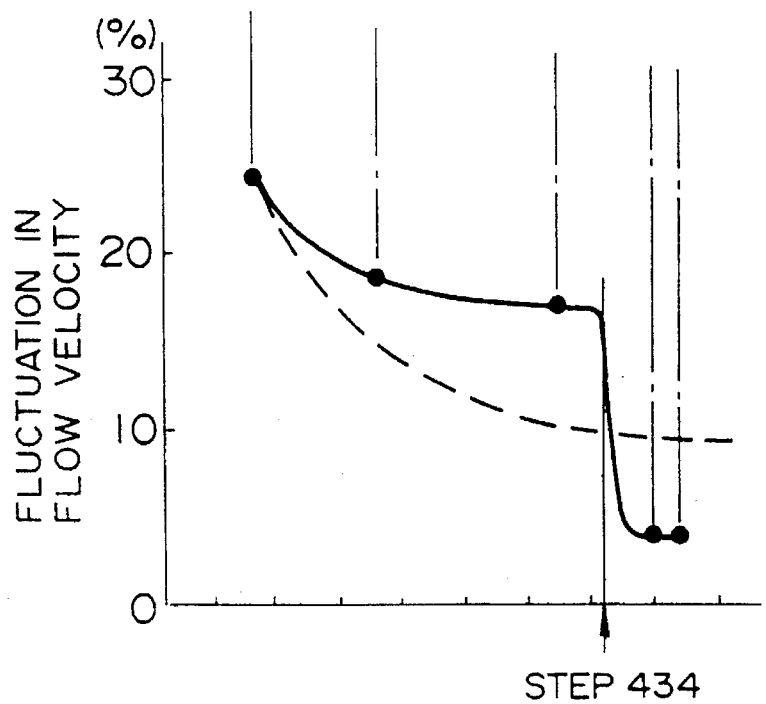
FIG. 6B

FLOW METER

The instant application is a division of No. 07/992,211, now abandoned, filed Dec. 17, 1992.

BACKGROUND OF THE INVENTION

The present invention relates to a flow meter for detecting a flow rate of fluid.

Particularly, the present invention is suitable for a flow meter in which a member or element forming a branch passage is supported within a main passage of fluid to measure a flow rate of fluid flowing through the branch passage.

Conventionally, as a fluid flow meter of the kind referred to above, an air flow meter has been known which detects a quantity of suction or intake air drawn into an engine of an automobile.

For example, "GAS FLOW RATE MEASURING DEVICE" disclosed in Japanese Patent Unexamined Publication No. 62-235525 has been known. This measuring device is provided with a shell-like element supported substantially at a central portion within a resin housing forming therein an intake passage for axial movement, to measure a quantity of air by a quantity of movement of the element.

However, since the flow meter has a moving portion, there are problems that the flow meter is weak in oscillation or vibration, a change in characteristic occurs due to friction, and the like.

Further, as a flow meter provided with no moving portion, a thermal flow meter has been known in which an exothermic body or a heating element is arranged within a fluid flow.

For example, in Japanese Patent Unexamined Publication No. 60-185118, a structure has been disclosed in which a cylindrical element is supported substantially at a center of an intake passage, and a branch passage is formed within the element so that a sensor is arranged within the branch passages.

In a technique disclosed in Japanese Unexamined Publication No. 60-185118, however, since an outlet of the branch passage the downstream side of stays which support a branch passage element within the main passage, there is a fear that turbulent flow within the main passage generated by the stays acts on an outlet opening. If the turbulent flow in the main passage acts on the output outlet opening, turbulence occurs in flow within the branch passage, and fluctuation is given to a flow rate introduced into the branch passage. Particularly, fluctuation occurs in the ratio between the flow rate in the main passage and the flow rate within the branch passage. Thus, there is a problem that it is impossible to accurately measure the flow rate within the intake passage.

SUMMARY OF THE INVENTION

It is an object of the invention to provide an improved flow meter.

Particularly, it is an object of the invention to reduce affection or influence of turbulence of flow to enable a flow rate to be accurately measured.

To this end, according to the present invention, provided is a flow meter which comprises:

a main passage through which the fluid flows;

a central element;

means connecting a wall surface of the main passage and the central element for supporting the central element substantially at the center of the main passage;

an introduction port opening to the central element for introducing a part of fluid flowing through the main passage;

a branch passage formed in the central element, through which fluid introduced from the introduction port flows;

a sensor arranged within the branch passage for measuring a flow rate of fluid flowing within the branch passages; and an outlet opening to a predetermined part of the central element for returning the fluid flowing through the branch passage to the main passage.

With the above arrangement of the invention, the outlet of the branch passage opens at a location on the upstream side of the downstream end of the supporting means. For this reason, it is possible to prevent the outlet opening of the branch passage from being influenced by the turbulent flow occurring at the downstream side of the supporting means.

Moreover, the outlet of the branch passages may open at a location at the upstream side of the upstream end of the supporting means. With this arrangement, it is possible to prevent entirely the outlet opening of the branch passage from being influenced by the turbulent flow occurred by the supporting means.

DETAILED DESCRIPTION OF THE EMBODIMENTS

Figure 2:
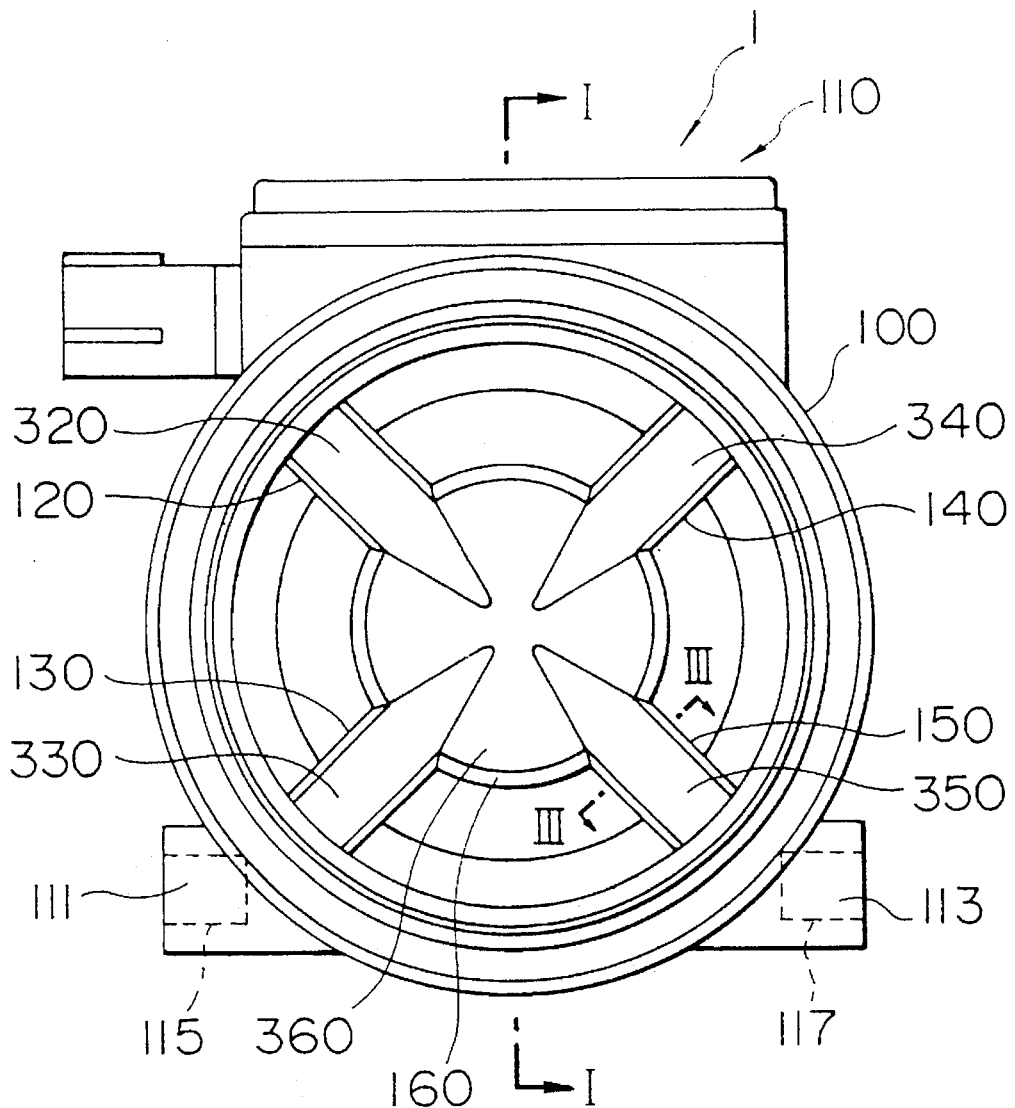
FIG. 2 is a side view of the embodiment shown in FIG. 1.
Figure 3:
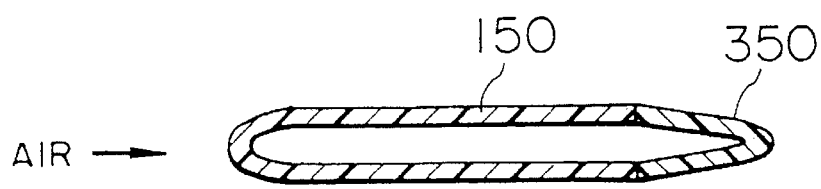
FIG. 3 is a cross-sectional view taken along a line III—III of FIG. 2.

An embodiment applied to a thermal air flow meter for measuring a quantity of suction or intake air drawn into an engine of an automobile will be described hereinafter with reference to FIGS. 1–3.

Figure 1:
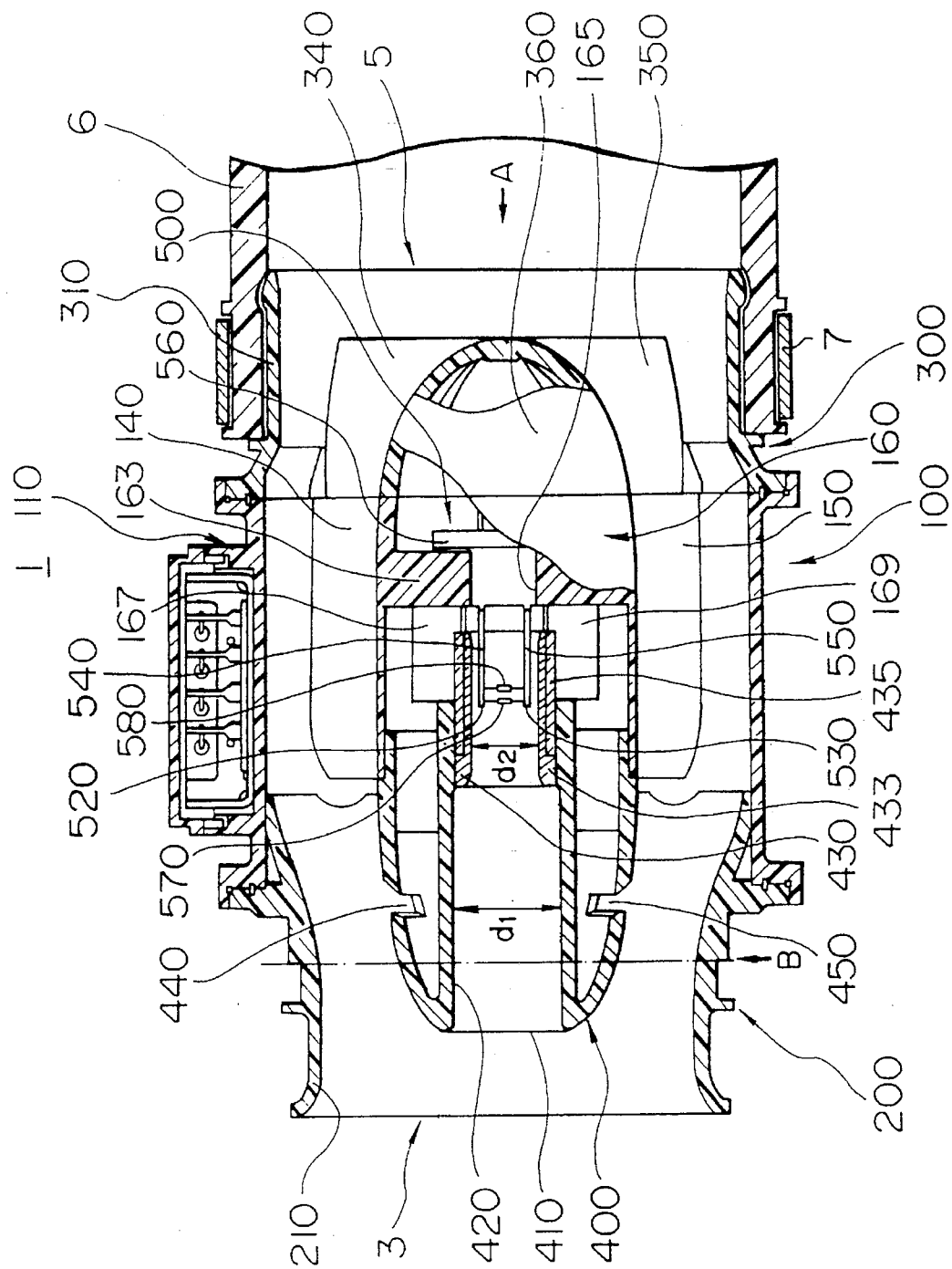
FIG. 1 is a cross-sectional view of a first embodiment to which the invention is applied, taken along the line I—I of FIG. 2.

Referring to FIG. 1, an intake air is introduced into an air flow meter 1 from the left side-in FIG. 1, and flows out to the right in FIG. 1. The air flow meter 1 has opposite end openings 3 and 5. The upstream side end opening 3 is to be inserted and mounted into a box-shaped air cleaner (not shown). On the other hand, the downstream side end opening 5 is inserted into an intake duct 6 larger in diameter than the air flow meter 1, and is tightened from an outer periphery thereof by a belt 7. A throttle valve (not shown) is arranged downstream of the intake duct 6 which is connected to an intake air passage in the engine.

The air flow meter 1 is provided with a central cylindrical portion 100 defining an intake passage, an upstream side cylindrical portion 200, and a downstream side cylindrical portion 300. These cylindrical portions are made by injection molding of a resin material.

A circuit container 110 housing therein a control circuit is integrally formed on an outer periphery of the central cylindrical portion 1. The container 110 is covered with a lid or closure. The control circuit is a one for a thermal sensor which will be described later. Further, a pair of support portions 115 and 117 in which nuts 111 and 113 are embedded are provided on the outer periphery of the central cylindrical portion 100 (FIG. 2). An inner periphery of the central cylindrical portion 100 represents a cylindrical configuration, and four rib portions 120, 130, 140 and 150 are integrally molded to extend radial inwardly. Moreover, a cylindrical central housing 160 is integrally molded at distal ends of the rib portions 120, 130, 140 and 150. The central housing 160 has a partition wall 163 which separate it into two halves. A bore 165 is formed at a center of the partition wall 163. The upstream cylindrical portion 200 is so formed that an inside cross-sectional area is gradually widened or enlarged toward the downstream side. An upstream end of the cylindrical portion 200 is formed with a bell mouth portion 210. The upstream cylindrical portion 200 is stepped at the outer periphery thereof to receive a grommet for mounting the air cleaner. The upstream cylindrical portion 200 is inserted and fixed into the inside of the central cylindrical portion 100.

The downstream cylindrical portion 300 is provided with a straight tubular portion 310 which is inserted into the intake duct 6. The cylindrical portion 300 is fixed to a downstream end of the central cylindrical portion 100. An inner periphery of the downstream cylindrical portion 300 represents a cylindrical configuration, and is integrally formed with four rib portions 320, 330, 340 and 350 projecting radial inwardly. A bowl-shaped housing 360 is integrally molded with the rib portions 320, 330, 340 and 350.

The rib portions 320, 330, 340 and 350 are located downstream of the rib portions 120, 130, 140 and 150. The cylindrical portions 100 and 300 are so combined that these rib portions are assembled to define the respective ribs as shown in FIG. 3, and the bowl-shaped downstream housing 360 closes a downstream side of the central housing 160 supported by the central cylindrical portion 100 to define a smooth shell-shaped configuration.

A shell-shaped upstream housing 400 made of resin is inserted and fixed into an upstream end of the central housing 160. An inlet opening 410 is provided in an upstream center of the upstream housing 400. A branch tube 420 is integrally formed on the upstream housing 400 to extend straight toward a downstream side from the inlet opening 410. A measuring tube 430 is inserted into the downstream end of the branch tube 420 so as to form a bypass passage. The measuring tube 430 has an inner tube 433 made of stainless steel and an outer tube 435 made of resin. A bell mouth is formed at an upstream end of the inner tube 433.

Here, a downstream side bypass passage portion defined within the measuring tube 430 has a diameter $d_2$ which is smaller than a diameter $d_1$ of an upstream side bypass passage portion defined within the branch tube 420. For this reason, a step is formed at a joint portion between the branch tube 420 and the measuring tube 430. The bell mouth is formed downstream of the step, whereby air flow flowing through the branch tube 420 is compressed at an inlet of the measuring pipe 430.

Further, outlet openings 440 and 450 are provided on the outer periphery of the shell-shaped upstream housing 400 to extend circumferentially. The outlet openings 440 and 450 are formed in plural substantially over the entire or whole periphery as circumferential slit-like openings. Moreover, the outlet openings 440 and 450 open in an inclined manner toward the downstream side extending toward the outer periphery from the inner periphery of the upstream housing 400. Furthermore, the wall surface of the downstream side is inclined more largely or greatly toward the downstream side than that of the upstream side, thereby air flows out smoothly. The upstream housing 400 is inserted through and fixed to an upstream side of the central housing 160. The downstream end of the branch tube 420 abuts against upstream side end surfaces of our plate-like ribs 167 and 169 extending radial inwardly from the central housing 160. In this connection, FIG. 1 shows only two ribs 167 and 169 of the four ones. According this, a predetermined clearance or gap is provided between the downstream side end of the branch tube 420 and the partition wall 163 of the central housing 160. Further, an air passage is obtained, which extends from the downstream side end of the measuring tube 430 to the outer peripheries of the measuring tube 430 and the branch tube 420. The upstream housing 400, the central housing 160 and the downstream housing 360 are assembled to cooperate with one another to define a cocoon configuration having a smooth outer periphery.

A restriction in which a cross-sectional area of the intake passage is restricted is formed between the upstream cylindrical portion 200 and the part of the upstream housing 400 disposed on the upstream side of the outlet openings 440 and 450. The flow-passage cross-sectional area at a location indicated by the one-dot-and-chain line B in FIG. 1 is most restricted. An air flow flowing from the upstream opening 3 is restricted by the restriction, and is rectified so as to be brought to uniform flow along the outer periphery of the upstream housing 400.

Moreover, a sensor portion 500 is inserted from the downstream side into the bore 165 in the partition wall 163, and then fixed to the partition wall 163. The sensor portion 500 is formed such that four support pins 520, 530, 540 and 550 are insert-molded onto one end of a cylindrical resin portion 510 to extend upstream, and a fixing flange 560 is fixed to the other end of the portion 510. The support pins are of two kinds, long and short. A pair of long pins 520 and 530 support one sensor 570, while a pair of short pins 540 and 550 support the other single sensor 580. The sensors 570 and 580 are so formed that a platinum wire is wound around an outer periphery of a ceramic bobbin, and is connected to lead wires at both ends of the bobbin. The sensors 570 and 580 must be identical with each other in characteristic.

Furthermore, a conductive element extends through the rib portion 140 from the space defined between the central housing 160 and the downstream housing 360 to the circuit container 110. The conductive element is connected to the support pin projecting toward the downstream side of the sensor portion 500 through a flexible wiring plate (not shown). Accordingly, the control circuit housed within the circuit container 110 is connected to the sensor through the conductive element, the flexible wiring plate and the support pins.

In the embodiment described above, the intake passage is formed inside the upstream cylindrical portion 200, the central cylindrical portion 100 and the downstream cylindrical portion 300. The upstream housing 400, the central housing 160 and the downstream housing 360 cooperate with one another to form the cocoon-shaped central element. The central element is supported at a center of the intake passage by means of four ribs. The intake air chiefly flows through the outside of the central element.

Furthermore, a branch passage is defined between the upstream housing 400 and the central housing 160, which extends from inlet opening 410 to the outlet openings 440 and 450 through the branch tube 420, the measuring tube 430, and the gaps between the measuring tube 430 and the partition wall 163. Accordingly, a part of air flowing through the intake passage is introduced from the inlet opening 410 into the measuring tube 430 through the branch tube 420. It collides with the partition wall 163 and then flows radially outwardly, and further flows towards the outlet openings 440 and 450 along the outward side of the branch tube 420. The air flows back to the suction passage from the outlet openings 440 and 450. Since the cross-sectional area of the intake passage adjacent to the outlet openings 440 and 450 is restricted, the flow speed or velocity in the intake passage increases to generate a negative pressure. Accordingly, the negative pressure draws air from the upstream housing 400.

A flow rate of air flowing within the branch passages is measured by the sensors 570 and 580 located within the measuring tube 430. One of the sensors is used to measure temperature, while the other is heated to a predetermined temperature, a quantity of radiation of which changes in accordance with the air flow rate. The control circuit detects an electric power consumed to maintain the other sensor at the predetermined temperature, and outputs an output signal representing the flow rate, which corresponds to the value of the detected power consumption. The output signal from the control circuit is supplied to a fuel injection control device or the like for computing a quantity of fuel injection. Since in the above-described embodiment, the restriction is disposed on the upstream side of the outlet openings 440 and 450, the negative pressure is applied at the outlet openings 440 and 450 uniformly over the entire periphery. For this reason, even if the air flow from the upstream opening 3 has a deviation, it is possible that the air flow is rectified to uniformly act upon the outlet openings 440 and 450 without any turbulence.

Moreover, the separation of air flow occurring on the surface of the central element also influences the outlet openings 440 and 450. However, the outlet openings 440 and 450 open at a location close to the upstream side of the central element in which the separation is relatively less occurred. Accordingly, the meter can work well in a wide range from the low flow rate to the high flow rate.

Furthermore, since the outlet openings 440 and 450 open upstream of the rib portions 120, 130, 140 and 150, the air can flow out from the outlet openings 440 and 450 without being influenced by the turbulent flow that occurs due to separation of air flow generated on the surfaces of the rib portions and by the turbulent flow occurred at the downstream ends of the rib portions.

Further, since the outlet openings 440 and 450 extend substantially over the entire periphery of the upstream housing 400, they are affected by the entire flow through the intake passage. For this reason, it is possible to prevent the flow rate within the branch passages from being fluctuated by a local turbulent flow.

As described above, the embodiment can maintain the air flow in the outlet openings 440 and 450 under a condition of less turbulence, thereby maintaining a ratio between the whole or entire flow rate of air flowing through the intake passage and the flow rate of air flowing through the branch passage accurately in a predetermined one. Therefore, the flow rate of the intake passage can be detected by measuring of the flow rate of the branch passage.

Moreover, the outlet openings 440 and 450 are provided so as to be inclined downstream toward the outside from the inside of the upstream shell-like housing 400, and the wall surface on the downstream side is more greatly inclined toward the downstream side than that of the upstream side. The openings 440 and 450 are provided in an upstream side or an enlargement portion in which the outer peripheral diameter of the central element gradually increases. Further, a gradually increasing portion in which an inner peripheral diameter gradually increases as a location approaches from downstream and is formed on the upstream cylindrical portion 200 which is located adjacent to the outer periphery of the enlargement portion. The enlargement portion of the central element is formed such that a gradually increasing rate of an outer peripheral diameter thereof is smaller than a gradually increasing rate of the inner peripheral diameter of the gradually increasing portion of the upstream cylindrical portion 200.

With the arrangement described above, air flows in the intake passage along the enlargement portion of the central element and then is inclined or directed radial outwardly. The air is further inclined or directed radial outwardly by means of the gradually increasing portion of the upstream cylindrical portion 200.

On the other hand, the air flow out from the outlet openings 440 and 450 can join to the air flow in the intake passage directed radially outwardly by a small juncture angle, because the openings are inclined toward the downstream side. Accordingly, two air flows can join to each other smoothly so that the collision can be considerably relieved. For this reason, it is possible to avoid that the air flow within the intake passage is restricted by the collision of the air flows to increase the pressure loss, and then it is possible to reduce the suction or intake resistance at the air flow meter 1. Accordingly, the intake air can be smoothly supplied to the internal combustion engine, thereby improving an engine output.

Moreover, the increasing rate of the gradually increasing portion of the upstream cylindrical portion 200 is greater than that of the enlargement portion of the central element. Accordingly, the increasing rate of the area of the intake passage on the downstream side of the outlet openings 440 and 450 is greater than that on the upstream side of the openings 440 and 450. Thus, even when the air out from the outlet openings 440 and 450 joins to the air flowing through the intake passage, it is possible to prevent the air flow within the intake passage from being restricted by the increment of the air. For this reason, it is possible to prevent the pressure loss from increasing. Accordingly, the air can be smoothly supplied to the internal combustion engine, thereby improving the engine output.

Furthermore, the downstream side rib portions 320, 330, 340 and 350 are disposed between the downstream housing 360 and the downstream cylindrical portion 300. These rib portions serve to prevent the straight tubular portion 310 from being deformed. Specifically, these rib portions prevent the straight tubular portion 310 from being deformed when the belt 7 is tightened to mount the straight tubular portion 310 of the downstream cylindrical portion 300 onto the intake duct 6. Further, if, at high temperature, the straight tubular portion 310 is deformed by a tightening force of the belt 7 and then a gap is generated between the intake duct 6 and the downstream cylindrical portion 300, the surplus air is supplied into the engine through the gap. Therefore, an air-fuel mixture becomes lean and reduces the output of the engine. However, since these rib portions prevent the straight tubular portion 310 from being deformed, the formation of the gap between the intake duct 6 and the downstream cylindrical portion 300 is also prevented, and then this prevents the air-fuel mixture from becoming lean. A second embodiment to which the invention is applied will be described with reference to FIG. 4. The difference from the first embodiment will be mainly described hereinafter.

Figure 4:
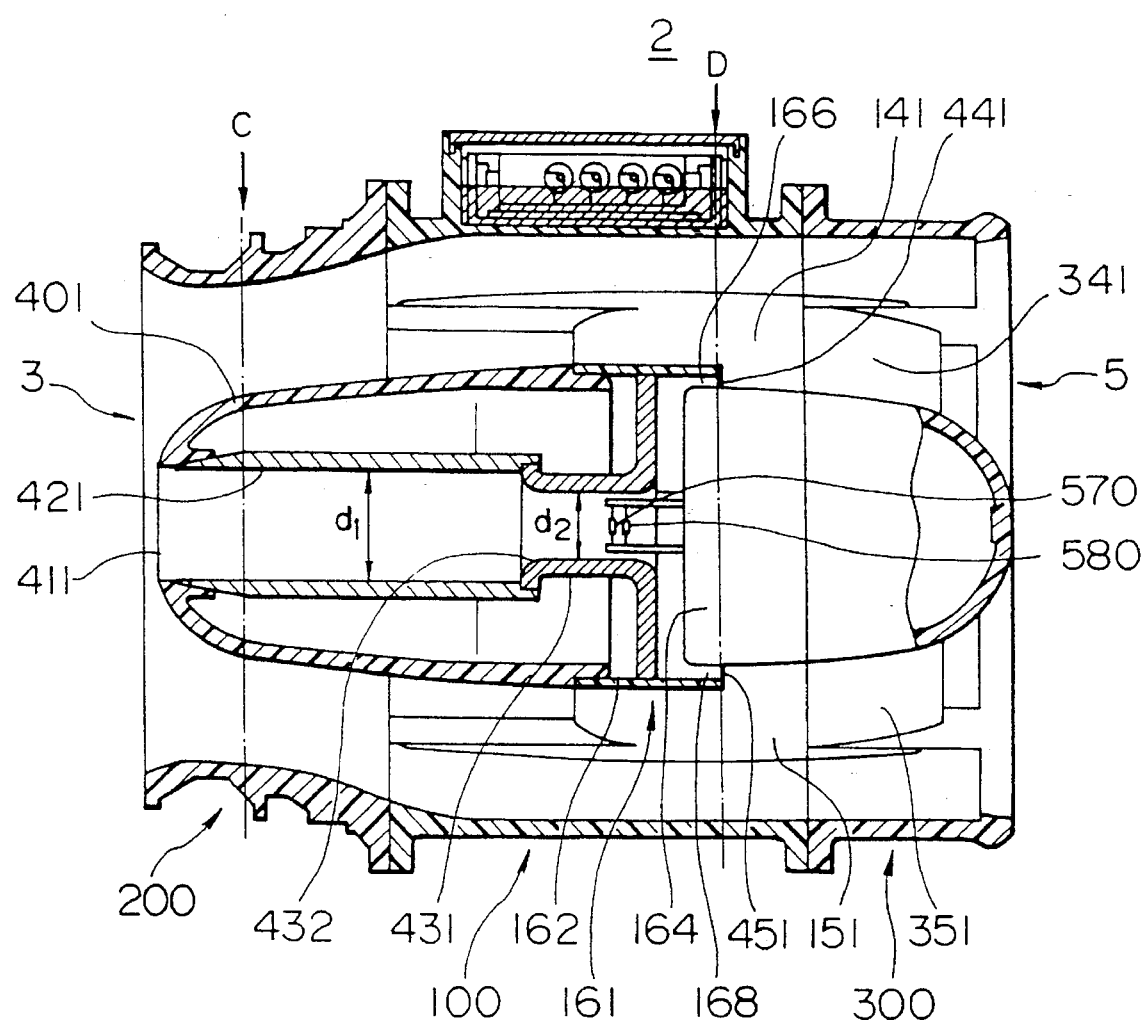
FIG. 4 is a cross-sectional view of a second embodiment to which the invention is applied.

Similar to the first embodiment, in the second embodiment, four ribs extend radial inwardly so as to support a central element at a central portion of the intake passage of a flow meter 2. The outlet openings of the branch passage are provided among rib portions 121, 131, 141 and 151 (121 and 131 are not shown). Furthermore, another rib portions 321, 331, 341 and 351 (321 and 331 are not shown) are disposed at downstream ends of the rib portions 121, 131, 141 and 151. In this embodiment, a central housing 161 has a cylindrical portion 162 and a wall portion 164 whose diameter is smaller than that of the cylindrical portion 162. The wall portion 164 is supported by the rib portions 121, 131, 141 and 151. For this reason, four thin arc passages are defined between the cylindrical portion 162 and the wall portion 164. FIG. 4 shows two passages 166 and 168 of the four. These passages are connected to the outlet openings 441 and 451.

Moreover, an upstream housing 401 formed with an inlet opening 411 is fixed to an upstream end of the cylindrical portion 162. A disk-like metal measuring element 431 provided with a tubular projection is fixed to the cylindrical portion 162. A branch tube element 421 is disposed between the inlet opening 411 and the measuring tube element 431 to connect them to each other thereby providing a branch passage. An inner diameter $d_1$ of the branch tube element 421 is formed larger than an inner diameter $d_2$ of the tubular projection of the measuring element 431. Further, an inlet 432 of the tubular projection of the measuring element 431 is formed into a smooth bell mouth configuration.

Accordingly, in this embodiment, a part of air in the intake passage is introduced into the branch passage from the inlet opening 411. The air passes through the branch tube element 421 and the measuring element 431, and collides against the wall portion 164, so that it is directed radial outwardly. Sequentially the air flows toward the outlet openings 441 and 451 through the arc passages 166 and 168. Moreover, a restriction C in which a cross-sectional passage area is smallest in the suction passages in the air flow meter 2 is disposed at a location indicated by the one-dot-and-chain line C in FIG. 4. A restriction D in which a cross-sectional passage area is secondary smallest is disposed at a position indicated by one-dot-and-chain line D in FIG. 4. Accordingly, the air from an upstream opening 3 is rectified to substantially uniform circumferentially at the narrowest restriction C, and then flows to the secondary narrowest restriction D. The negative pressure is generated due to an increase in flow velocity at the restriction D. Thus, air within the branch passage is sucked out of the outlet openings 441 and 451.

According to this embodiment, since the outlet openings 441 and 451 are provided at a downstream side of the restriction C, the deviation in flow in the vicinity of the outlet openings 441 and 451 is reduced, and then the air from the branch passage can stably joint to the air flowing in the intake passage. Further, since the outlet openings 441 and 451 are provided substantially over the entire periphery except for the rib portions, it is possible to apply the mean or average negative pressure, in accordance with the flow rate of the entire intake passage, to the outlet openings. Thus, it is possible to stabilize a ratio of the flow rate within the branch passages to the flow rate within the entire intake passage. Moreover, in this embodiment, since the output openings 441 and 451 are provided among the ribs, the air can flow out from the branch passage without being influenced by the turbulent flow occurs due to the ribs. For this reason, the drawbacks that the turbulent flow occurs within the branch passage, and the flow rate within the branch passages cannot correspond to the flow rate in the entire intake passage can be overcome. Thus, the flow-rate measurement can be made accurately.

Furthermore, also in a case of this embodiment, the deformation of the downstream cylindrical portion 300 can be prevented by the rib portions 321, 331, 341 and 351 which are disposed downstream of the rib portions 121, 131, 141 and 151. Thus, it is possible to prevent the cylindrical portion 300 from deforming when it is connected to an intake duct and is tightened by a belt.

In connection with the above, in the first embodiment shown in FIG. 1, the branch passage extends the inside and the outside of the branch tube, a relative between long branch passage can be obtained with a compact manner as compared with the embodiment in FIG. 4. Further, since the long branch passage can be formed compact, the length and the configuration of the branch passage can be readily designed. Particularly, it is possible to readily adjust a sensor responsiveness to change based on the quantity of intake air, or responsiveness with respect to intake pulsation and counterflow in the engine.

On the contrary, in the second embodiment in which the outlet openings are provided among the ribs as shown in FIG. 4, it can be expected to restrain the influence due to turbulent flow that occurs on the upstream ends and the surfaces of the ribs by shortening a part of the rib disposed an upstream side of the outlet openings. In the second embodiment shown in FIG. 4, the axial length of the rib is made short as compared with the embodiment in FIG. 1. Furthermore, in the first embodiment shown in FIG. 1, the outlet openings 440 and 450 are provided on the upstream side as compared with those in the second embodiment shown in FIG. 4. Therefore, in the first embodiment, the ribs can be formed to extend to an upstream side as compared with the second embodiment shown in FIG. 4 thereby improving the strength thereof.

In the embodiments described above, the housing of the air flow meter forming a part of the intake passage can be axially divided into a plurality of parts. Further, the sensor portion is to be axially inserted from the downstream side wall into the branch passage. Therefore, the air flow meter can be obtained by merely axially assembling or mounting the cylindrical parts. Thus, it is possible to facilitate the operation.

The arrangement in which the reinforcing structure due to the ribs is applied to the thermal flow meter has been described in connection with the above-mentioned embodiments. However, the reinforcing structure due to the ribs may be applied to the flow meter of a displacement type disclosed, for example, in Japanese Patent Unexamined Publication No. 62-235525.

Figure 5:
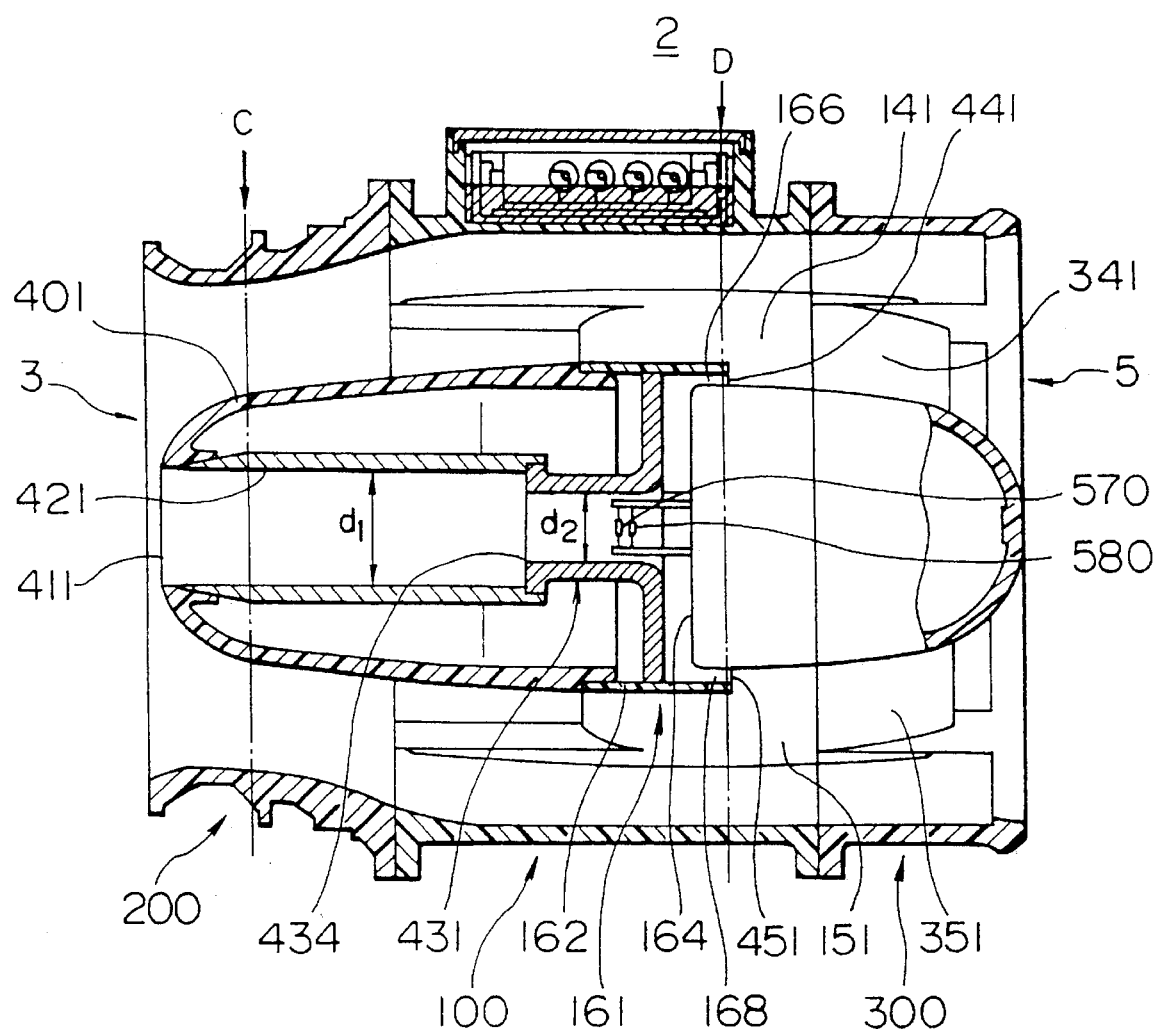
FIG. 5 is a cross-sectional view of a third embodiment to which the invention is applied.

A third embodiment of the invention will be described with reference to FIG. 5. In this connection, the same reference numerals are applied to the parts or elements the same as or equal to those of the second embodiment. The difference will be mainly described hereinafter.

In this embodiment, an inlet 434 of a tubular projection of a measuring element 431 is formed as a rectangular step.

In case that a fluctuation in air flow velocity (turbulence) occurs upstream of a thermal flow meter 2, if the turbulence is introduced into an inlet portion 411, a part of the turbulent air flow is rectified in a passage within a branch tube element 421. Further, fluctuation in air flow velocity (turbulence) is reduced by a compressed air flow generated at the inlet 434 of the measuring element 431. Accordingly, even if there is turbulence or deviation of the air flow from the upstream side of the thermal flow meter 2, it is possible to effect accurate flow-rate measurement which is not influenced by the turbulence and deviation. According to this embodiment, even if the fluctuation of the quantity of intake air is large, an accurate electrical output signal corresponding to the quantity of intake air can be obtained. Therefore, the post treatment such as correction of the electric signal and the like is omitted.

Figure 6:
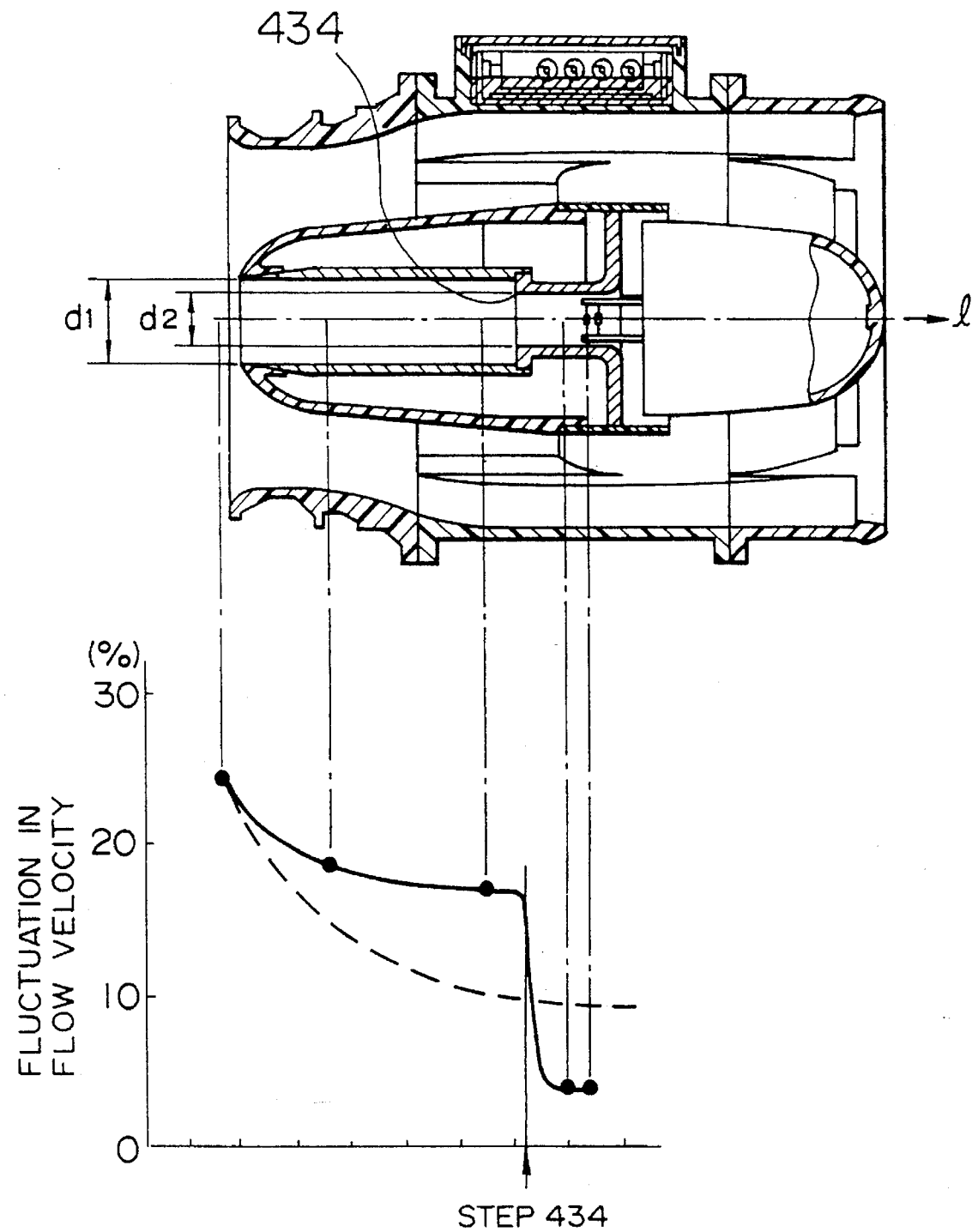
FIG. 6A is the same as FIG. 5 but with vertical lines relating to similar lines in FIG. 6B which is a characteristic chart showing fluctuation in flow speed in the third embodiment.
Figure 10:
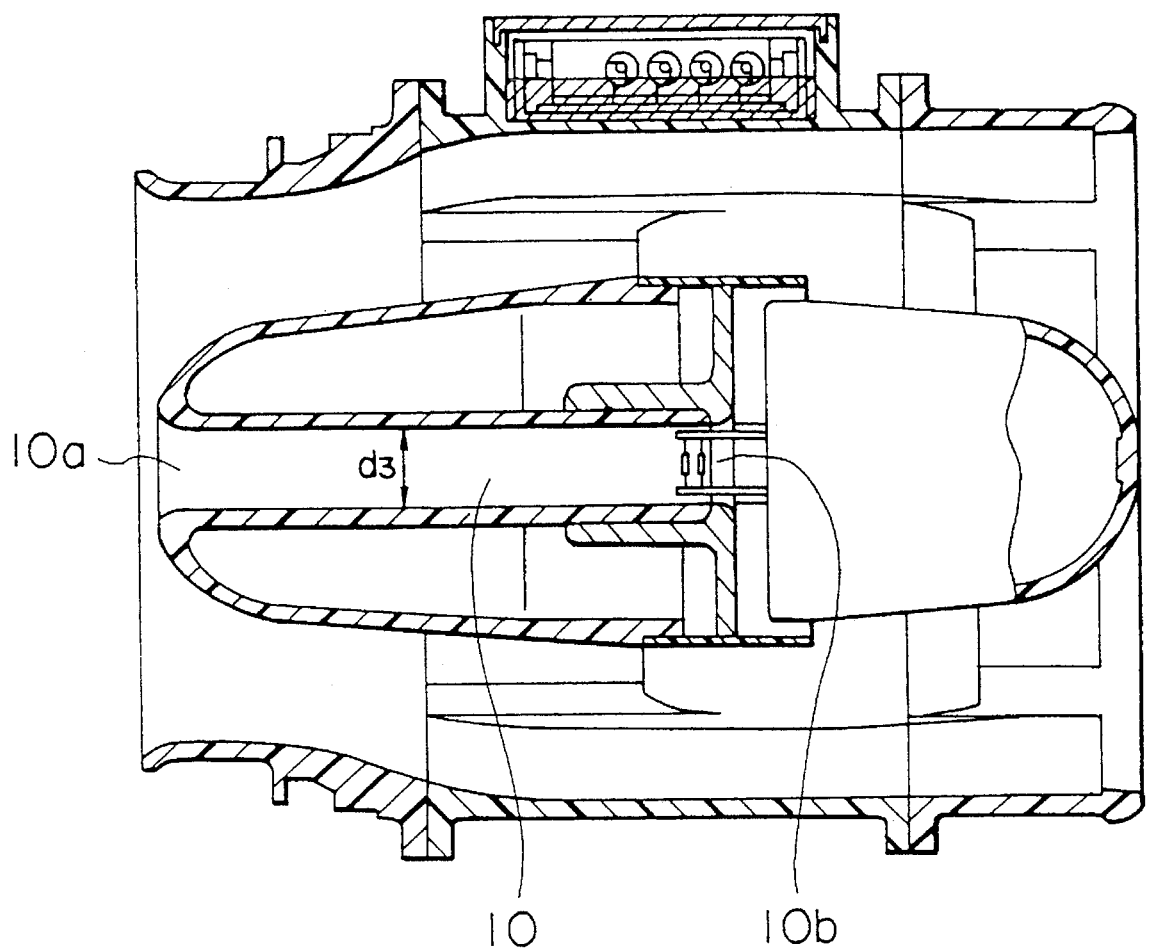
FIG. 10 is a cross-sectional view showing the comparison example.

Referring to FIG. 6, the experimental results are described hereinafter, which indicate the fluctuation of the air flow velocity in the branch passage in the thermal flow meter 2. In the drawings, the experimental results of a comparison example are also indicated. The comparison thermal flow meter has, as shown in FIG. 10, a branch passage 10 in parallel to an intake passage, which extends straight from a start end 10a to a terminate end 10b thereof and has a uniform diameter $d_3$. In this comparison example, an arrangement except for the branch passage 10 is substantially similar to that of the third embodiment shown in FIG. 5. In the experiments, a reduction degree of fluctuation (disturbance) of air flow velocity within the branch passage is measured by a high responsive hot-wire flow meter as the fluctuation (disturbance) in air flow velocity.

As indicated by a solid line in FIG. 6B, according to the third embodiment, it will be seen that fluctuation in air flow velocity is considerably reduced at the downstream side of the inlet 434 of the measuring element when the passage diameter is reduced. On the contrary, in the comparison example, as indicated by a broken line in FIG. 6B, any considerable reduction in fluctuation of air flow velocity cannot be seen, but the fluctuation is merely reduced gradually.

Next, referring to FIG. 7, a fluctuation in sensor output according to change of a ratio $d_1/d_2$ of the passage diameter $d_1$ and the passage diameter $d_2$ will be described hereinafter. The experiment is carried out under a condition that a thermal flow meter is mounted on the downstream portion of the air cleaner.

Figure 7:
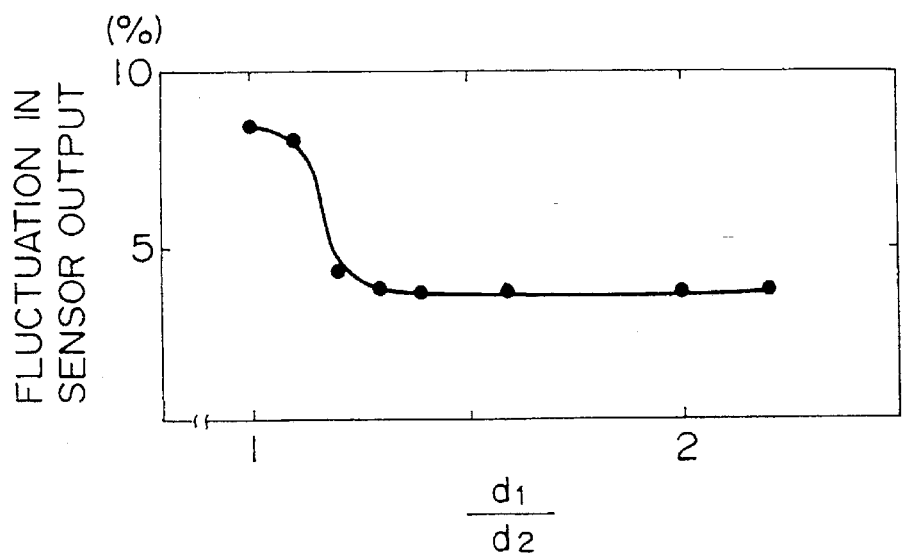
FIG. 7 is a characteristic chart showing fluctuation in sensor output with changing the ratio $d_1/d_2$ of a diameter of the branch passages changed in the third embodiment.

As is apparent from FIG. 7, when the ratio $d_1/d_2$ exceeds 1.2, the fluctuation in sensor output is considerably reduced. Further, it is also apparent that even if the ratio $d_1/d_2$ increases sufficiently, the fluctuation in sensor output is not so much reduced.

Moreover, referring to FIG. 8, the relationship between the change of the fluctuation in sensor output and the change of flow velocity of intake air flowing within the thermal flow meter 2 will be described hereinafter.

Figure 8:
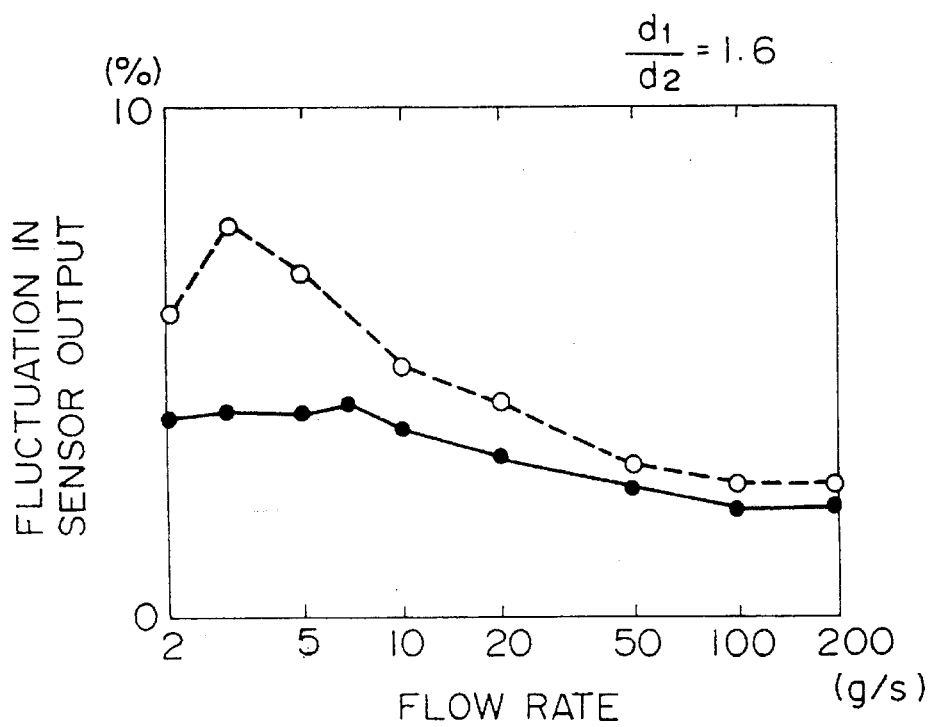
FIG. 8 is a characteristic chart showing relationships between an air flow rate and a fluctuation in sensor output with respect to the third embodiment and a comparison example, respectively.

According to the third embodiment, as indicated by a solid line in FIG. 8, it is apparent that the fluctuation in sensor output is sufficiently reduced even though the flow rate is low. In this manner, according to the third embodiment, since the fluctuation in sensor output is relatively reduced over all of a range from a low flow rate to a high flow rate, there is an advantage that it is possible to accurately effect measurement of air flow rate. On the contrary, in the comparison example, as indicated by a broken line, the fluctuation in sensor output is relatively high in the case that the flow rate is relatively low. According to the third embodiment, it is apparent that there is an advantage, being that it is possible to accurately effect measurement of the air flow rate in a wide air flow-velocity range from low velocity to high velocity, even under such a condition that the running state of affairs or running circumstances are considerably changed like an internal combustion engine which is loaded on an automobile.

Figure 9:
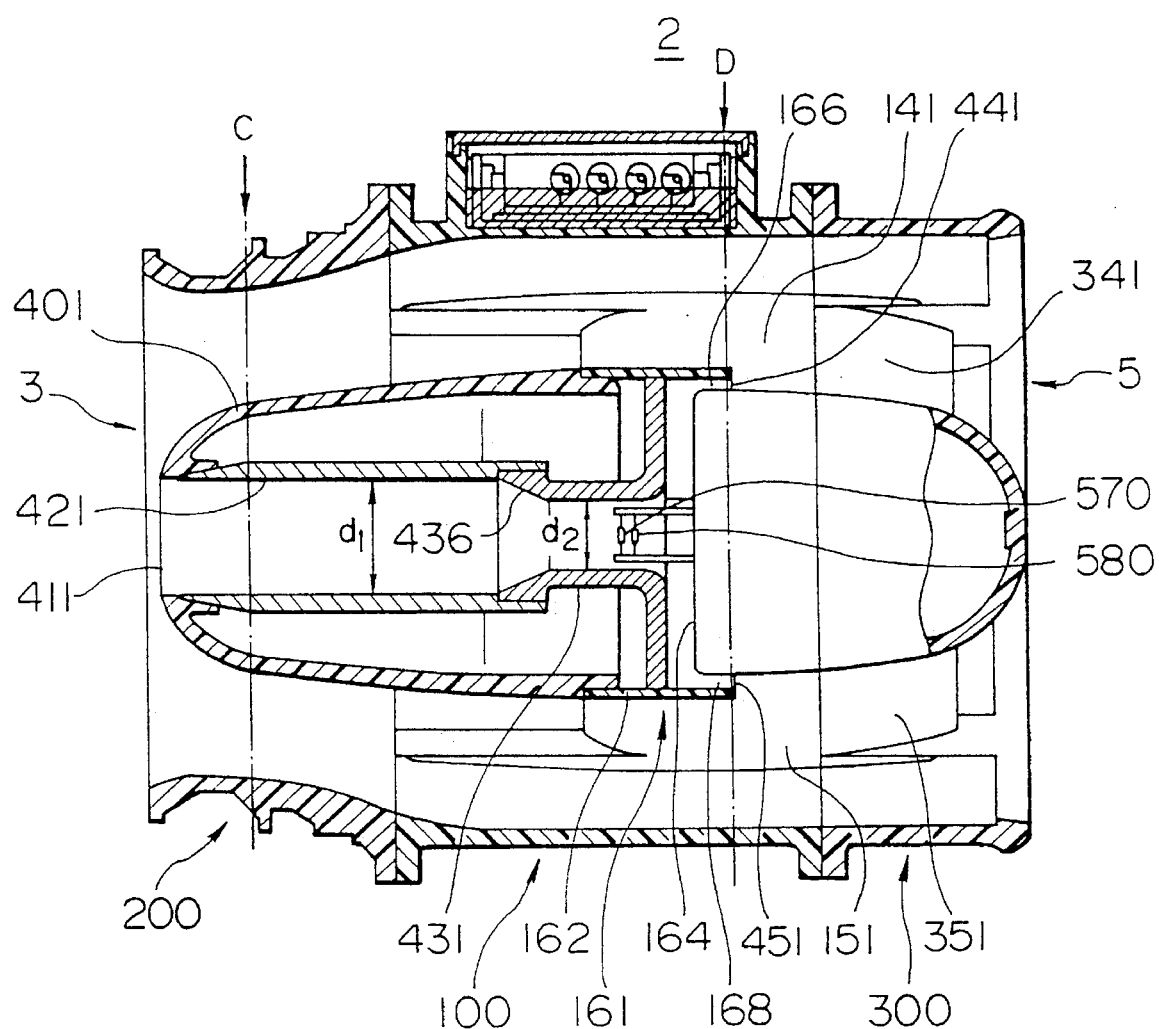
FIG. 9 is a cross-sectional view of a fourth embodiment to which the invention is applied.

A thermal flow meter according to a fourth embodiment of the invention, as shown in FIG. 9, has a conical inlet 436 of a tubular projection including a measuring element 431, instead of included with inlet 434 of the third embodiment. This embodiment considerably reduces the fluctuation in air flow velocity on a downstream side of the inlet 436, as compared with the comparison example shown in FIG. 10 in which the branch passage diameter is uniform. Accordingly, there can be produced an advantage that even if there is a fluctuation in temperature or in flow velocity of the intake air, measurement of air flow passing through the intake passage is accurately carried out and then represented as an electric signal by means of a resistor for measurement of flow velocity and a resistor for compensation of temperature which are arranged on the tubular projection of the measuring element.

In connection with the above, if the inlet of the tubular projection of the measuring element 431 is formed to the bell-mouth configuration as shown in FIGS. 1 or 4, the separation of flow at reduction point from $d_1$ to $d_2$ is reduced so that fluctuation in flow velocity can be reduced.

What is claimed is:

1. A flow meter comprising:

a main passage through which fluid to be measured flows, said passage having a substantially circular cross section;

a central element having a substantially circular cross-section, disposed at a substantially radial central portion of said main passage, said central element including an upstream part, relative to a direction of fluid flow through said main passage, and a downstream part, said downstream part being supported by means of at least one rib portion, each said rib portion having an upstream end and a downstream end relative to said direction of fluid flow, said upstream part being connected to said downstream part;

a branch passage formed in said upstream part of said central element, said branch passage including an inlet through which said fluid flows from said main passage to said branch passage and an outlet through which said fluid flows into said main passage, said outlet opening at a wall surface of said upstream part of said central element, upstream of said downstream end of said rib portion;

wherein said upstream part of said central element comprises:

a hollow shell member including an inlet opening opened towards an upper stream side of said main passage and an outlet opening opened towards an outer periphery of said central element; and a cylindrical member disposed within said shell member and extending from said inlet opening, said branch passage extending from said inlet opening to said outlet opening through said cylindrical member and a space between said cylindrical member and said shell member, said branch passage including an outer peripheral subpassage defined by said cylindrical member and said hollow shell member and an inner subpassage defined by said cylindrical member, and said outer peripheral subpassage including an outlet which is said outlet of said branch passage; and a flow rate sensor disposed in said branch passage.

2. A flow meter according to claim 1, wherein said outlet of said branch passage opens at a location between the downstream end and an upstream end of said rib portion.

3. A flow meter according to claim 2, wherein said outlet of said branch passage opens at an outer periphery of said central element except a portion thereof connected to said rib portion.

4. A flow meter according to claim 3, wherein said outlet of said branch passage opens towards a downstream side of the flow of fluid to be measured and parallel to said flow.

5. A flow meter according to claim 1, wherein said outlet of said branch passage opens at an upstream side of said upstream end of said rib portion.

6. A flow meter according to claim 5, wherein said outlet of said branch passage opens towards a downstream side of the flow of fluid to be measured and slants radially outwardly.

7. A flow meter according to claim 6, wherein said flow rate sensor is supported by said downstream part of said central element and extended from said downstream part of said control element into said cylindrical member.

8. A flow member according to claim 1, wherein said upstream part and said downstream part of said central element are made of resin.

9. A flow meter as in claim 1, wherein said central element is elongated in the direction of fluid flow through said main passage and each said rib portion has a thickness in a direction transverse to said direction of fluid flow greater than the diameter of said central element supported thereby.

10. A flow meter as in claim 1, wherein there are a plurality of output openings defined about the outer periphery of said central element.

11. A flow meter as in claim 1, wherein an upstream portion of said inner subpassage has a diameter greater than a diameter of a downstream portion of said inner subpassage, said upstream portion of said inner subpassage and said downstream portion thereof each extending in a longitudinal direction of said central element.

12. A flow meter as in claim 1, wherein an outer diameter of said hollow shell gradually increases from said inlet opening to a point downstream thereof whereby said upstream part of said central element is generally bullet-shaped.

13. A flow meter as in claim 1, wherein a diameter of said downstream part of said central element gradually increases from a downstream end thereof to a point upstream of said downstream end, whereby said downstream part is generally bullet-shaped.

* * * * *